(12) United States Patent
Nicot

(10) Patent No.: US 6,443,017 B1
(45) Date of Patent: Sep. 3, 2002

(54) DEVICE FOR MEASURING TORSIONAL COUPLE ON A MECHANICAL ELEMENT

(75) Inventor: Chrisophe Nicot, Epagny (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/185,063

(22) Filed: Nov. 3, 1998

(30) Foreign Application Priority Data

Nov. 7, 1997 (FR) .............................. 97 14019

(51) Int. Cl.[7] .................................. G01N 3/22
(52) U.S. Cl. .................... 73/847; 73/862.335
(58) Field of Search ................ 73/847, 848, 814, 73/862.193, 862.333, 862.334, 862.335, 862.321

(56) References Cited

U.S. PATENT DOCUMENTS

| | | | |
|---|---|---|---|
| 4,503,713 A | | 3/1985 | Obayashi et al. |
| 4,530,413 A | * | 7/1985 | Buike et al. ............... 180/79.1 |
| 4,589,290 A | | 5/1986 | Sugiyama et al. |
| 4,926,121 A | * | 5/1990 | Guay .......................... 324/208 |
| 5,018,393 A | | 5/1991 | Seegers |
| 5,195,382 A | * | 3/1993 | Peilloud ................. 73/862.321 |
| 5,490,431 A | | 2/1996 | O'Mahony et al. |
| 5,501,110 A | * | 3/1996 | Peilloud et al. ......... 73/862.321 |
| 5,731,529 A | * | 3/1998 | Nicot ..................... 73/862.326 |
| 5,913,251 A | * | 6/1999 | Nicot |

* cited by examiner

Primary Examiner—Max Noori
(74) Attorney, Agent, or Firm—John C. Bigler; Glenn M. Massina

(57) ABSTRACT

A device for measuring torsional couple on a mechanical element, which includes two magnetic field generators attached in a first plane of the mechanical element and two magnetic field detectors arranged in a second parallel plane offset with respect to the first plane. The magnetic field detectors are attached on a support having two housings facing the magnetic field generators and which receive sensor elements on which the magnetic field detectors are attached. The shape of the housings is suited so as to allow movement of the sensor elements in such a way as to make possible an adjustment of an initial position of a sensitive element of each magnetic field detector on the support.

8 Claims, 4 Drawing Sheets

DEVICE FOR MEASURING TORSIONAL COUPLE ON A MECHANICAL ELEMENT

BACKGROUND OF THE INVENTION

This invention relates generally to a device for measuring torsion and, more particularly, to a device for measuring torsional couple on a mechanical element of the type described, for example, in the publication FR-2692986.

This type of device has two magnetic field generators, connected with a first support and situated in the plane of one cross section of a shaft, and two magnetic field detectors, connected with a second support and immobilized in the plane of another cross section of the shaft. The magnetic field detectors deliver a signal which is proportional to the torsional couple on account of the relative angular offset of the magnetic field generators with respect to the magnetic field detectors. Such a device can be mounted directly on any type of mechanical element.

The measuring precision of such a device, in particular in the case of small angular offsets of the detectors with respect to the generators, depends to a great extent on the initial positioning precision of the magnetic field detectors with regard to facing the magnetic transition situated at the junction of two magnets comprising the magnetic field generator. In effect, if the detector is offset with respect to the magnetic transition while no couple is applied to the mechanical element, this generates a nonzero signal whose value varies with the temperature, which disturbs the measurement of the torsional couple.

A known method for remedying this disadvantage is to improve the positioning precision of the detectors by reducing the tolerances concerning the production of the components and the assembly, but this reduction of the tolerances is accompanied by a great increase of the cost of production of the device. Another solution consists of correcting the signal emitted by each detector by means of an electronic circuit suited in such a way as to cancel electronically the base signal emitted by each detector when no torsional couple is applied to the mechanical element. However, this solution leads to the production of a complex device, having a cost that is inappropriate for the simplest applications.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for measuring torsional couple on a mechanical element, comprising two magnetic field generators attached in a first plane of the mechanical element and two magnetic field detectors arranged in a second plane parallel to the first plane and offset with respect to the first plane. The magnetic field detectors are attached on a support having two housings facing the magnetic field generators, each housing receiving a sensor element on which one of the magnetic field detectors is attached. The shape of the housings is suited so as to allow movement of the sensor elements in such a way as to make possible an adjustment of an initial position of a sensitive element of each magnetic field detector on the support.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
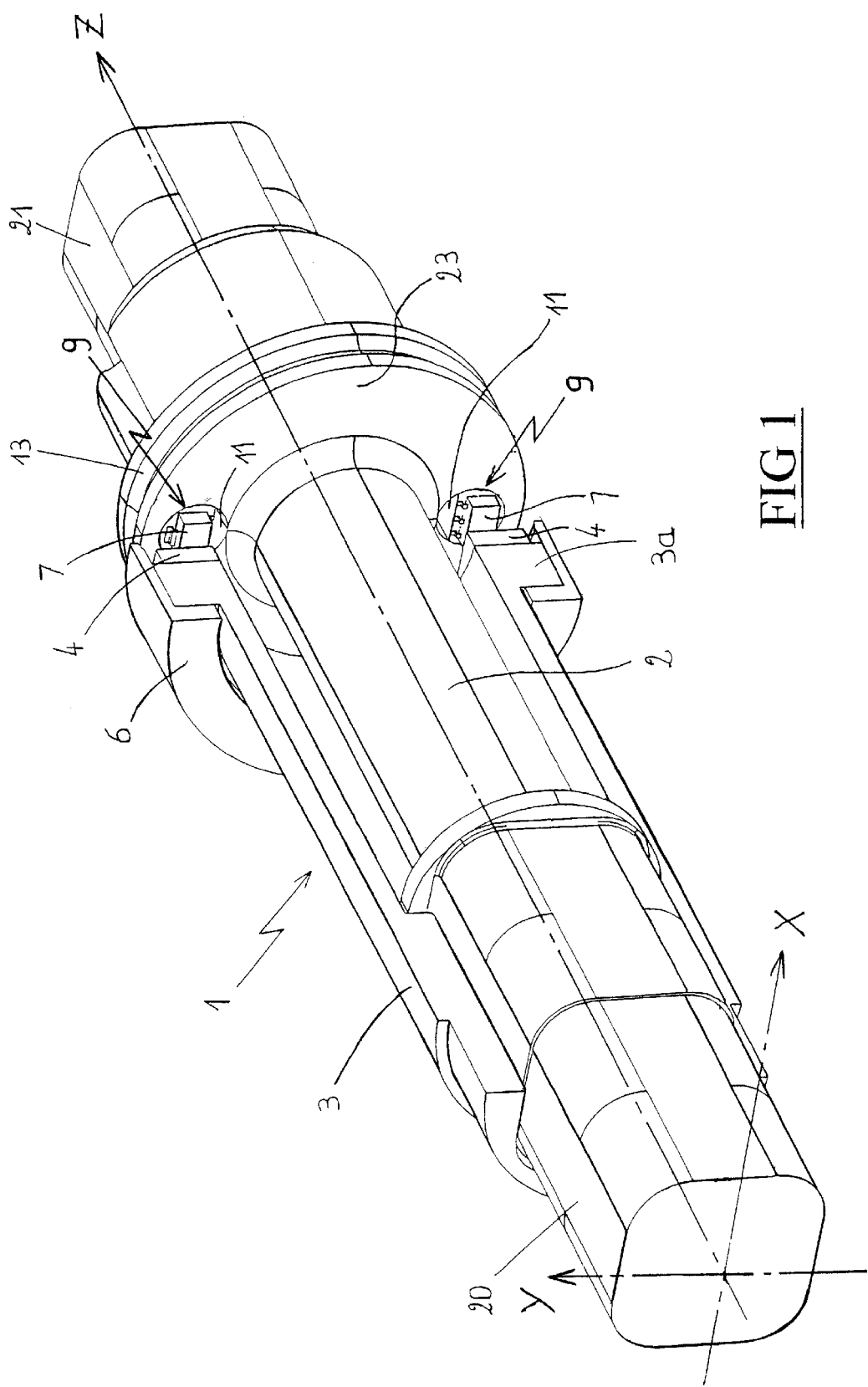
FIG. 1 is a perspective view of a shaft fitted with a torsion measuring device illustrating the present invention.
Figure 2:
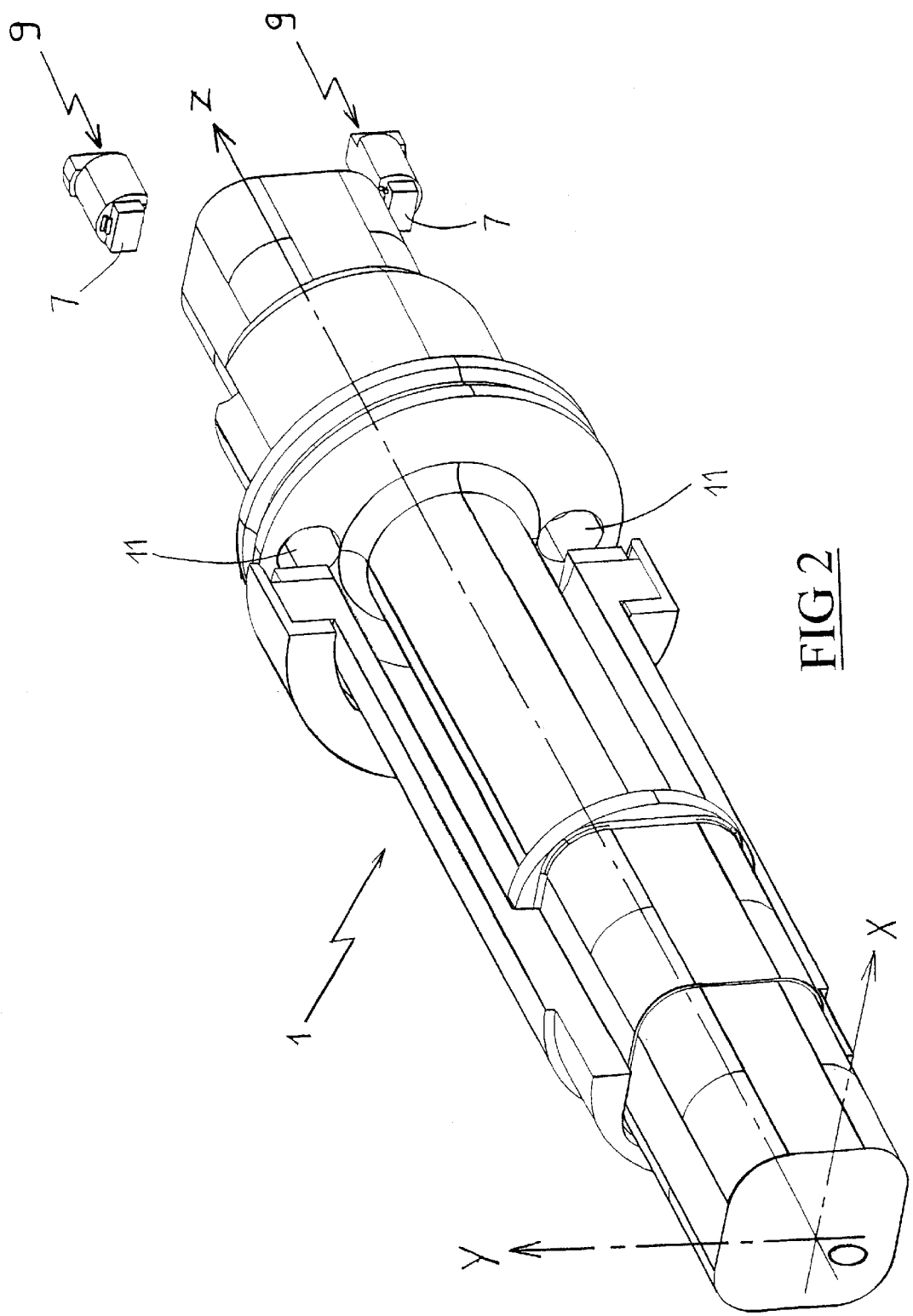
FIG. 2 is a perspective view of the shaft and torsion measuring device of FIG. 1 before mounting of the sensor elements.

Referring now to the drawings, shaft 1, illustrated in FIG. 1 and 2, is intended to be integrated in a steering column so as to produce the connection between a steering rack and a transmission shaft (not illustrated), according to one example applying the present invention. To this effect, shaft 1 has at its two ends hook-up zones 20 and 21, illustrated as shanks with a square cross section. Shaft 1 has, in a known manner, zone 2 of reduced diameter, which allows one to locate axially the torsional strain, and interior bearing track 13, allowing one to integrate a rolling bearing, not illustrated, as described in FR 96-07731.

FIG. 1 illustrates shaft 1 equipped with a device for measuring the torsional couple, whose functioning is described in the publication FR-2692986. This shaft 1, preferably made of ferromagnetic material, has flange 23 carrying bearing track 13 on its periphery and having, on its lateral edges, two holes 11 arranged symmetrically on both sides of the axis of shaft 1. Shaft 1 also bears encoder element 3 consisting of a roughly tubular body with, at one end, a reduced bore with square cross-sectional fit over shaft 1. The other end of the body of encoder element 3 extends radially as annular part 3a, made of ferro-magnetic material, carrying two magnetic field generators 4 arranged symmetrically with respect to the axis of shaft 1 and facing holes 11 of flange 23.

Channeling element 6, made of magnetic material, is connected on annular part 3a of encoder element 3 so as to channel the magnetic field lines around generators 4. In the embodiment illustrated, magnetic field generators 4 are produced by two parallelepiped magnets placed end to end and whose magnetic induction vectors are directed in opposite directions. This arrangement of the magnets makes possible a high gradient of the magnetic field for a displacement in the direction of axis OX as described in the publication FR-2692986.

Figure 3:
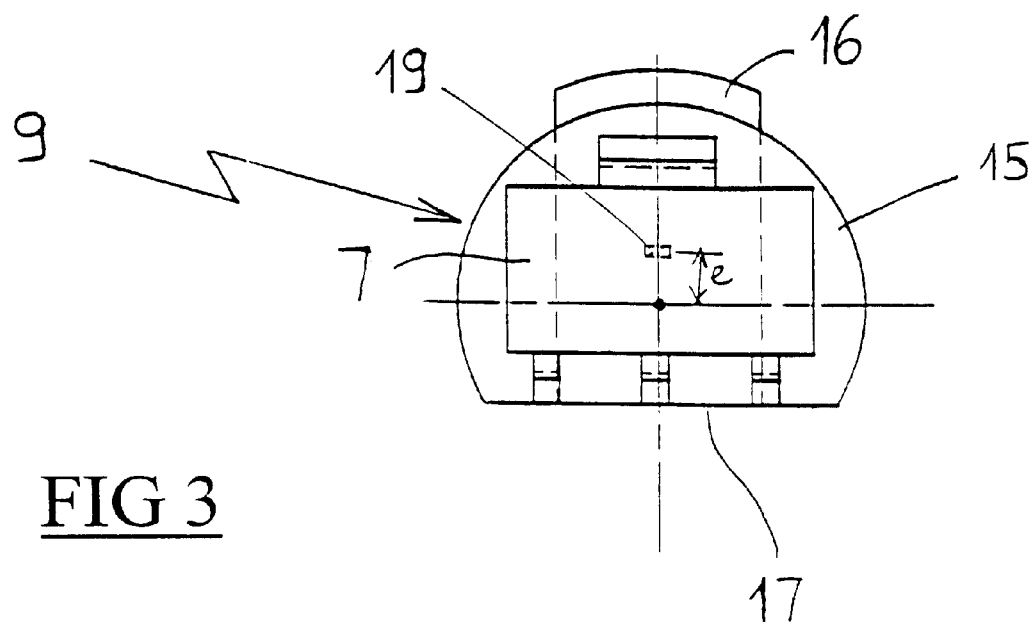
FIG. 3 is a side view of a sensor element as fitted in the torsion measuring device of FIG. 1, illustrated separately.
Figure 4:
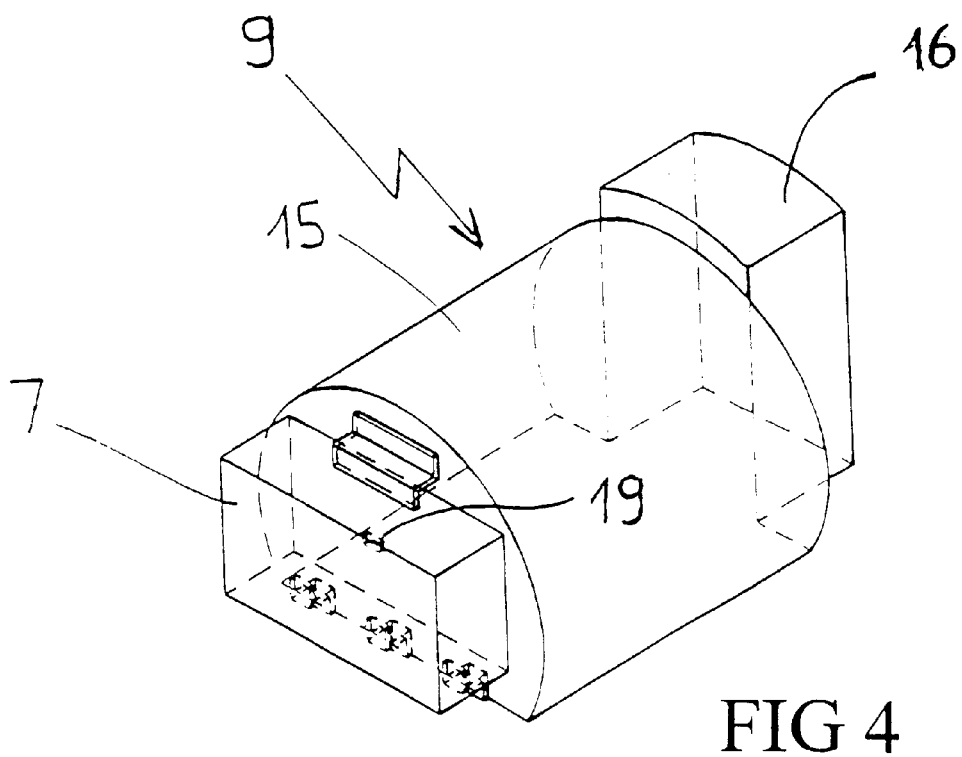
FIG. 4 is a perspective view of the sensor element illustrated in FIG. 3.

Sensor element 9 with cylindrical body 15, preferably made of ferromagnetic material, is inserted axially through holes 11, these holes having a diameter suited for allowing the free rotation of sensor element 9 about the axis OZ. This sensor element 9, illustrated separately in FIGS. 3 and 4, has, at one end of its cylindrical body 15, magnetic detector 7 which is intended to face magnetic field generator 4. The other end of cylindrical body 15 has lengthening piece 16 which limits the axial movement of sensor element 9 inside the holes 11. Magnetic detector 7 has sensitive element 19 which is arranged in an off-centered manner with respect to the circular cross section of sensor element 9 so that the rotation of sensor element 9 generates a displacement of sensitive element 19 about axis OX.

Cylindrical body 15 of sensor element 9 also has flat part which frees a space by which an electrical contact between magnetic detector 7 and an electrical supply circuit can be ensured, for example, by means of a coaxial connector.

The functioning of the device is as follows: During assembly of the elements constituting the device, an operator positions the sensor elements 9 inside holes 11 and measures the signal provided by the two sensor elements 9 by means of a suitable apparatus. This signal is a function of the position of sensitive element 19 with regard to the magnetic transition, formed by the abutment of the two parallelepiped magnets forming field generator 4. The operator can then roughly cancel this signal by turning sensor element 9 in such a way as to bring sensitive element 19 to face the magnetic transition of the magnetic field generator.

Figure 5:
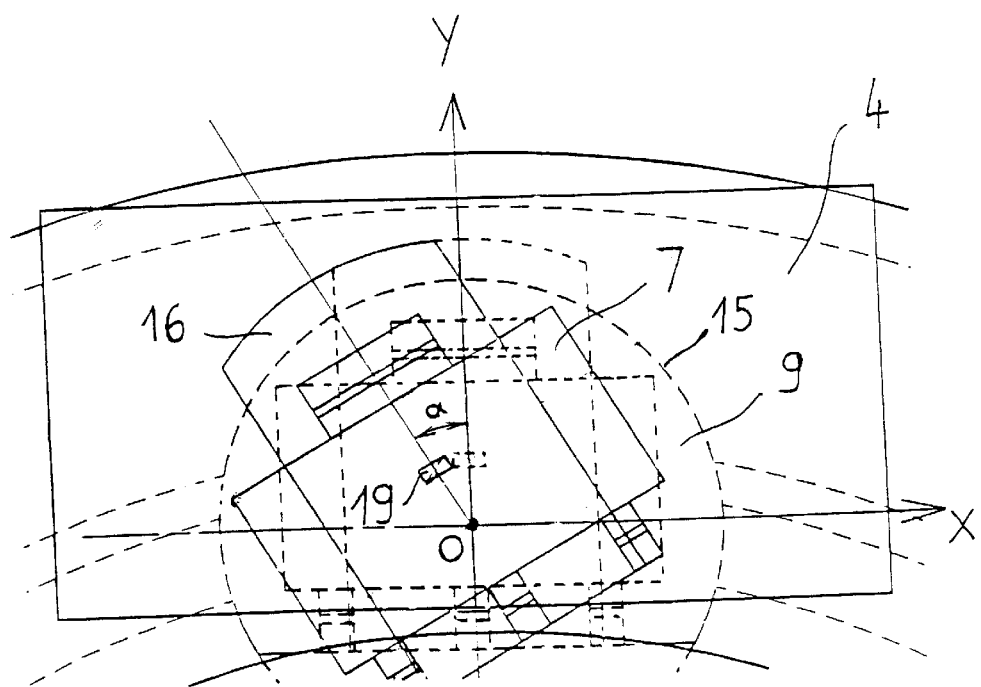
FIG. 5 is a side view of a portion of the sensor element of FIG. 3 together with a magnetic field generator facing it during an initial phase of adjustment of the torsion measuring device of the present invention.

This operation of initial adjustment of the position of sensor element 9 is illustrated in FIG. 5, in which one sees that since sensitive element 19 is off-center by a distance "e" with regard to the center of cylindrical body 15 of sensor element 9, a rotation by angle a of the cylindrical body 15 results in a displacement of the sensitive element 19 about the axis OX by a distance "d" according to the equation:

$$d=e*\sin(\alpha).$$

It is thus easy for the operator to bring sensitive element 19 to face the magnetic transition by coordinating the rotation of sensor element 9 with the reading of the signal emitted by magnetic detector 7, the range of adjustment offered by the rotation of sensor element 9 being greater than the dispersions of positioning of the magnetic field generator 4.

The power of the signal provided by each magnetic detector 7 can also be modulated by modifying the axial penetration of sensor element 9 through holes 11 in such a way as to modify the air gap between magnetic detector 7 and the magnetic field generator 4 facing it. In the example illustrated, this air gap is brought to a constant value by bringing lengthening piece 16 to a stop against a wall of flange 23 so that the power of the signal provided by each detector is equivalent. Once these adjustments are made, sensor elements 9 are immobilized, for example, by means of an adhesive.

The device of the present invention provides excellent measuring precision by making possible an initial adjustment of the position of the sensor elements, and which is simple and economical to produce. The immobilizing of the sensor elements may be accomplished by gluing the sensor elements after the initial adjustment, or by other stop means. The sensor elements may comprise studs having a body suited for turning freely inside the housing and having a sensitive element that is off-center with respect to the center of a cylindrical housing, making it possible, by simple rotation of the stud, to adjust the initial position of the sensitive element. The sensor elements may also support a power supply and signal processing circuit.

Of course, the invention is in no way limited to the embodiment described and illustrated which is given only as an example. In particular, the invention can be applied to any type of mechanical element, such as a girder or a frame, on which it is necessary to integrate a device for measuring torsional couple.

Having described the invention, what is claimed is:

1. A device for measuring torsional couple on a mechanical element, the device comprising:

two magnetic field generators attached in a first plane of the mechanical element; and two magnetic field detectors arranged in a second plane parallel to the first plane and attached on a support, wherein the support has two housings facing the magnetic field generators, each housing receiving a sensor element on which one of the magnetic field detectors is attached, each of the two housings having a shape to allow movement of the sensor elements in such a way as to make possible an adjustment of an initial position of a sensitive element of each magnetic field detector on the support.

2. A device for measuring torsional couple according to claim 1, wherein the sensor element also supports a power supply and signal processing circuit.

3. A device for measuring torsional couple according to claim 1, further comprising stop means for securing the sensor elements after the adjustment of the initial position of the sensitive elements on the support.

4. A device for measuring torsional couple according to claim 1, wherein the magnetic field generators comprise two parallelepiped magnets butted together with respective induction vectors in opposite directions.

5. A device for measuring torsional couple according to claim 1, wherein the housings are cylindrical and the sensor elements each comprise a stud, the stud having a body suited for turning freely inside the cylindrical housing and having a magnetic field detector with a sensitive element that is off-center with respect to the center of the cylindrical housing.

6. A device for measuring torsional couple according to claim 5, wherein the studs each have an axial stop which limits the axial displacement of the studs inside the cylindrical housings.

7. A device for measuring torsional couple according to claim 1, wherein the mechanical element is a rotatable shaft and the two magnetic field generators are arranged symmetrically with respect to the rotatable shaft.

8. A device for measuring torsional couple according to claim 3, wherein the stop means comprises glue.

* * * * *

UNITED STATES PATENT AND TRADEMARK OFFICE
CERTIFICATE OF CORRECTION

PATENT NO.   : 6,443,017 B1
DATED        : September 3, 2002
INVENTOR(S)  : Christophe Nicot It is certified that error appears in the above-identified patent and that said Letters Patent is hereby corrected as shown below:

<u>Column 3,</u>
Line 25, delete "a" and insert -- $\alpha$ --

Signed and Sealed this

Thirty-first Day of December, 2002

JAMES E. ROGAN
*Director of the United States Patent and Trademark Office*